(No Model.)
F. W. SCHROEDER.
WHEEL FOR VEHICLES.
No. 593,128. Patented Nov. 2, 1897.
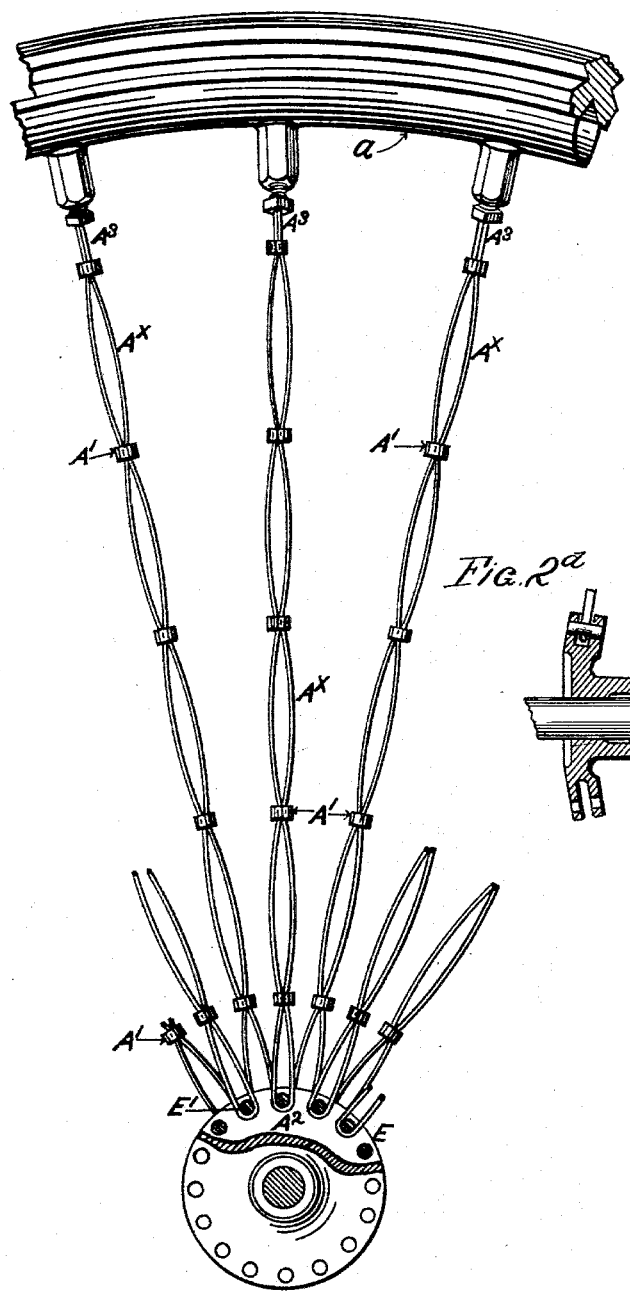
Fig:1.
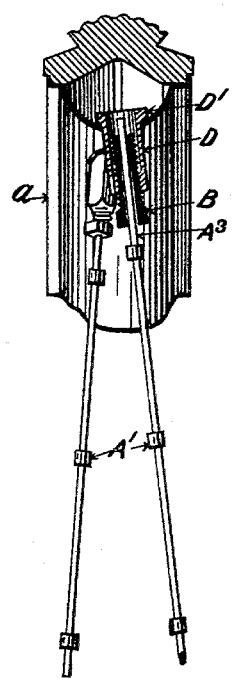
Fig:2.
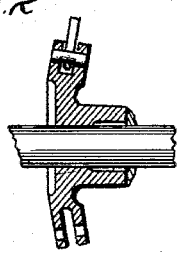
Fig:2ᵈ
Fig:3.
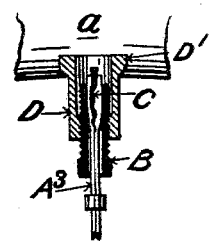
Fig:4.
Witnesses.
Inventor.
Frederick William Schroeder.
By James L. Norris.
Atty.

United States Patent Office.

FREDERICK WILLIAM SCHROEDER, OF NEWTOWN, NEW SOUTH WALES, ASSIGNOR, BY DIRECT AND MESNE ASSIGNMENTS, TO SCHROEDER'S SPECTACLE SPOKE WHEEL COMPANY, LIMITED, OF SYDNEY, NEW SOUTH WALES.

WHEEL FOR VEHICLES.

SPECIFICATION forming part of Letters Patent No. 593,128, dated November 2, 1897.

Application filed August 8, 1896. Serial No. 602,184. (No model.)

*To all whom it may concern:*

Be it known that I, FREDERICK WILLIAM SCHROEDER, engineer, a subject of the Queen of Great Britain, residing at Newman Street, Newtown, near Sydney, in the British Colony of New South Wales, have invented new and useful Improvements in Wheels for Road-Vehicles, Cycles, and the Like, of which the following is a specification.

This invention relates to certain improvements in wheels for road-vehicles, cycles, and the like, by means of which may be produced light, strong, and cheap wheels for the purpose, which wheels will minimize any jar or jolting caused by uneven roads and will have quickly-renewable spokes. These improvements in wheels for road-vehicles, cycles, and the like refer to the spokes, to devices for affixing the spokes to the rim or tire and tensionally adjusting them, and to devices, including special constructions of hubs or bosses, for affixing the inner ends of the spokes, all as hereinafter described and specifically claimed.

In order that this invention may be clearly understood, reference will now be made to the drawings herewith, wherein—

Figure 1 is a side elevation, partly in section, of a portion of my improved wheel. Fig. 2 is a transverse sectional view of the rim and tire and illustrating the means for attaching the spokes to the rim. Fig. $2^d$ is a detail sectional view illustrating the means for attaching the inner ends of the spokes to the hub. Fig. 3 is a cross-sectional view of one of the spokes, and Fig. 4 is a sectional detail view of modified means for attaching the spokes to the rim.

The improved spoke according to this invention is formed of two pieces in two parts or halves A, braced or coupled together by straps A' in a series of loops or circles or the like $A^x$, so as to form one whole whose end $A^2$ is affixed to the hub and whose other end $A^3$ is affixed to the rim, as hereinafter described. These half-spokes are preferably constructed of half-round metal, though they might be equally as well made of metal of any other section. In use any jar or jolt caused by unevenness of the road or way will be felt not so much by the axle and boss as by the spokes of the wheel. The improved spokes by the elasticity obtained by their looped construction and their tensional tightening, hereinafter described, "compensate" or give to jars or jolts or transfer them to the rim or tire and preserve the axle therefrom.

The spokes being affixed to the boss of the wheel, as hereinafter described, are affixed to the rim or tire with tensional adjustment by means of the devices illustrated, and consisting, mainly, of a hollow or bored screwed piece, hereinafter termed the "nipple," (in which the end of the spoke is held,) and a screwed socket, hereinafter termed the "thimble," (which is held to the rim or tire.) The nipple screwing into the thimble gives the requisite and necessary stretching or tensional adjustment of the spoke. In Figs. 2 and 4 the spoke end $A^3$ is passed through the nipple B, and, its inner half-faces being corrugated, a wedge or holding-piece C is placed between and the spoke drawn back, so that the spoke ends and wedge will jam and hold together, when, the nipple B being screwed into the thimble D, (which is held to the rim $a$ by its flange D',) the tension or amount of resilient force and stiffness in the spoke is regulated.

The boss or hub is made with flanges so constructed that the inner spoke ends may be quickly affixed thereto, and so in case of necessity a spare spoke may be easily substituted for an injured one. The spokes are made of the one piece, and their inner end forms a loop $A^2$.

As shown in Fig. $2^d$, the hub or boss consists of a disk $E^3$, having a grooved or slotted periphery provided with orifices $E^4$, through which are inserted pins $E^5$, taking in the two sides of the slot and through the looped ends of the spokes.

In order to prevent the working out or falling out of the pins $E^5$, the central part is made eccentric to the parts taking in the metal of the slotted disk, the sides of the loop in the jaw making an effective lock against side movement of the eccentric pins $E^5$.

Having now particularly described and explained the nature of my said invention and in what manner the same is to be performed, I declare that what I claim is—

1. In a wheel, the combination with the rim and the hub consisting of a disk having a grooved or slotted periphery and pins passing through the said slotted periphery, of a series of spokes attached at their outer ends to said rim, each spoke consisting of a single piece of doubled metal bent to form a series of loops or eyes, and straps or clips embracing the two parts of the spokes between said loops or eyes, the inner end loop of each spoke being in engagement with one of the said pins, substantially as described.

2. In a wheel, the combination with the rim and hub, of a series of spokes attached at their opposite ends to said rim and hub, each spoke consisting of a single piece of metal semicircular in cross-section and bent or doubled to form a series of loops or eyes with the flat faces adjacent to each other, and straps or clips embracing the two parts of the spokes between said loops or eyes, substantially as described.

3. In a wheel, the combination with the rim and the spokes attached to said rim at their outer ends and provided at their inner ends with loops or eyes, of the hub consisting of a disk having a grooved or slotted periphery provided with orifices between which the loops or eyes on the inner ends of the spokes are arranged, and pins having reduced central portions, said pins passing through said orifices and the loops or eyes, substantially as described.

4. In a wheel, the combination with the hub and the bifurcated spokes attached thereto at their inner ends, the rim, the hollow thimbles rotatively mounted in said rim, the exteriorly-threaded nipples screwed into said thimbles and in which the ends of the spokes are disposed and wedges arranged between the ends of the spokes and operating to jam the spokes in the nipples, substantially as described.

Dated this 15th day of June, 1896.

FREDERICK WILLIAM SCHROEDER.

Witnesses:
   FRED WALSH,
   THOMAS JAMES WARD.